(12) United States Patent
Li

(10) Patent No.: US 11,523,036 B2
(45) Date of Patent: Dec. 6, 2022

(54) IMAGING DEVICE AND DISPLAY APPARATUS

(71) Applicant: Anhui Hongcheng Opto-Electronics Co., Ltd., Bengbu (CN)

(72) Inventor: DongGui Li, Bengbu (CN)

(73) Assignee: Anhui Hongcheng Opto-Electronics Co., Ltd., Bengbu (CN)

(*) Notice: Subject to any disclaimer, the term of this patent is extended or adjusted under 35 U.S.C. 154(b) by 112 days.

(21) Appl. No.: 17/122,569

(22) Filed: Dec. 15, 2020

(65) Prior Publication Data
US 2022/0141359 A1 May 5, 2022

(30) Foreign Application Priority Data
Oct. 30, 2020 (CN) .......................... 202011186712.9

(51) Int. Cl.
*H04N 5/225* (2006.01)
*H04N 5/232* (2006.01)
*F16M 11/14* (2006.01)

(52) U.S. Cl.
CPC ........... *H04N 5/2254* (2013.01); *F16M 11/14* (2013.01); *H04N 5/23293* (2013.01)

(58) Field of Classification Search
CPC ... H01L 27/146–14893; H04M 1/0264; G02B 13/001–009; H04N 5/2257
USPC ...... 348/374, 340, 357; 396/520; 250/208.1; 257/225–234, 257, 258, 291–294, 257/431–448
See application file for complete search history.

(56) References Cited

U.S. PATENT DOCUMENTS

2004/0009790 A1* 1/2004 Im .................... H04M 1/0264
348/E5.025

FOREIGN PATENT DOCUMENTS

CN 205961284 U 2/2017

* cited by examiner

*Primary Examiner* — Xi Wang

(57) ABSTRACT

The present disclosure relates to an imaging device and a display apparatus. The imaging device includes: a casing including a first accommodating cavity therein, wherein a first opening is provided at one end of the first accommodating cavity; a lens module including a rotating portion and an extension portion connected to the rotating portion, the rotating portion being accommodated in the first accommodating cavity, the extension portion extending through the first opening to an exterior of the casing; and a mounting component, which is at least partially accommodated in the first accommodating cavity and fixed to the casing, wherein the rotating portion is hinged with the mounting component via a spherical joint.

13 Claims, 8 Drawing Sheets

IMAGING DEVICE AND DISPLAY APPARATUS

CROSS-REFERENCE TO RELATED APPLICATION

This application is based on and claims priority to Chinese Patent Application No. 202011186712.9 filed on Oct. 30, 2020, which is incorporated herein by reference in its entirety.

TECHNICAL FIELD

The present disclosure relates to the field of photography, and in particular to an imaging device and a display apparatus.

BACKGROUND

The existing camera is generally fixed on the interactive display screen. Since the position of the camera is not adjustable, the camera itself cannot be rotated relative to the interactive display screen. Therefore, the coverage range of the camera is limited and local regions cannot be captured. When the camera is located at a high position, it may cause the angle of the recorded picture to be bad, resulting in poor shooting effect.

SUMMARY

The present disclosure provides an imaging device and a display apparatus, which is rotatable omnidirectionally within a preset angle range, thereby increasing the coverage region of the field of view, and ensuring the imaging effect.

An embodiment of the present disclosure provides an imaging device, which includes: a casing including a first accommodating cavity therein, wherein a first opening is provided at one end of the first accommodating cavity; a lens module including a rotating portion and an extension portion connected to the rotating portion, the rotating portion being accommodated in the first accommodating cavity, the extension portion extending through the first opening to an exterior of the casing; and a mounting component, which is at least partially accommodated in the first accommodating cavity and fixed to the casing, wherein the rotating portion is hinged with the mounting component via a spherical joint.

According to an aspect of the embodiment of the present disclosure, the mounting component includes a first clamping member, a second clamping member, and a connecting member for connecting the first clamping member and the second clamping member, at least one of the first clamping member and the second clamping member is fixed to the casing; and the first clamping member includes a spherical, first inner surface, the second clamping member includes a spherical, second inner surface, and the rotating portion is disposed between the first inner surface and the second inner surface and is in sliding contact with the first inner surface and the second inner surface.

According to an aspect of the embodiment of the present disclosure, the first clamping member further includes a limiting portion extending from the first inner surface in a direction away from the rotating portion, the lens module further includes a protruding portion protruding relative to the rotating portion, the protruding portion is inserted into the limiting portion, and the limiting portion is configured to limit a rotation range of the rotating portion by the protruding portion.

According to an aspect of the embodiment of the present disclosure, the limiting portion includes a stop surface surrounding an exterior of the protruding portion, the stop surface is a cylindrical surface, the protruding portion is cylindrical, and the cylindrical surface has a diameter greater than that of the protruding portion.

According to an aspect of the embodiment of the present disclosure, the limiting portion includes a stop surface surrounding an exterior of the protruding portion, the protruding portion is cylindrical, and the stop surface includes a first flat face and a second flat face that are arranged in parallel to each other, the first flat face and the second flat face are parallel to an axial direction of the casing and an axial direction of the protruding portion, the protruding portion is disposed between the first flat face and the second flat face, and the protruding portion has a diameter equal to a distance between the first flat face and the second flat face.

According to an aspect of the embodiment of the present disclosure, the imaging device further includes a circuit board, the circuit board is at least partially accommodated in the first accommodating cavity, the circuit board is disposed on a side of the rotating portion away from the extension portion and is electrically connected to the lens module; and at least one of the first clamping member and the second clamping member is provided with a fixing column, and the circuit board is fixed to the fixing column.

According to an aspect of the embodiment of the present disclosure, the casing is provided with a first through hole, the first through hole is in communication with the first accommodating cavity, the circuit board includes an interface, and the interface protrudes out of the casing through the first through hole.

According to an aspect of the embodiment of the present disclosure, the imaging device further includes a base, the base includes a basal portion fixed to the exterior of the casing, the basal portion includes a second through hole which is disposed opposite to the first through hole, and the interface passes through the second through hole.

According to an aspect of the embodiment of the present disclosure, the base further includes a mounting portion and a positioning portion, and the mounting portion and the positioning portion are located on a side of the basal portion away from the casing and connected to the basal portion.

According to an aspect of the embodiment of the present disclosure, a second opening is further provided at the other end of the first accommodating cavity; and the imaging device further includes a cover plate that is clamped to the casing and covers the second opening.

According to an aspect of the embodiment of the present disclosure, a plurality of protrusions are provided on an inner surface of the casing, and the plurality of protrusions are arranged to be spaced apart from each other along a circumference of the casing, and a groove is provided on each of the protrusions; and the cover plate includes a cover plate body and a plurality of hooks located inside the cover plate body, the plurality of hooks are arranged to be spaced apart from each other along a circumference of the cover plate body, and each of the hooks is inserted into a corresponding one of the grooves and is clamped by the protrusion.

According to an aspect of the embodiment of the present disclosure, the first accommodating cavity includes a first portion and a second portion, the first portion has an aperture smaller than that of the second portion, and a stepped surface is formed at the connection between the first portion and the second portion; and the rotating portion is accommodated in the first portion, and the cover plate body is at least partially accommodated in the second portion and abuts against the stepped surface.

According to an aspect of the embodiment of the present disclosure, the imaging device further includes a heat conduction block, and the heat conduction block is sandwiched between the circuit board and the cover plate and is in contact with the circuit board and the cover plate.

According to an aspect of the embodiment of the present disclosure, the rotating portion and the extension portion are integrally disposed and a second accommodating cavity is formed therein, and a third opening formed on the extension portion and a fourth opening formed on the rotating portion are provided at two ends of the second accommodating cavity; and the lens module further includes a lens body, a lens, and a connecting wire harness, the lens body is accommodated in the second accommodating cavity and capable of imaging, the lens is connected to the extension portion and covers the third opening, and the connecting wire harness is connected to the lens body and protrudes out through the fourth opening.

A further embodiment of the present disclosure also proposes a display apparatus including a display device and the imaging device described in the above embodiment, and the imaging device is connected to the display apparatus.

In the imaging device according to the embodiments of the present disclosure, the rotating portion is hinged with the mounting component via the spherical joint, therefore, the lens module can be omnidirectionally rotatable within a preset angle range by means of the cooperation of the rotating portion and the mounting component, thereby increasing the coverage region of the field of view of the lens module and ensuring the imaging effect. The rotating portion and the mounting component are integrated into the first accommodating cavity of the casing, therefore, the imaging device can have a more compact structure and a smaller volume. The extension portion extends through the first opening to the exterior of the casing, therefore, the lens module can be freely rotated from the exterior of the casing by using the extension portion.

DESCRIPTION OF THE DRAWINGS

The features, advantages, and technical effects of exemplary embodiments of the present disclosure will be described below with reference to the accompanying drawings.

Figure 1:
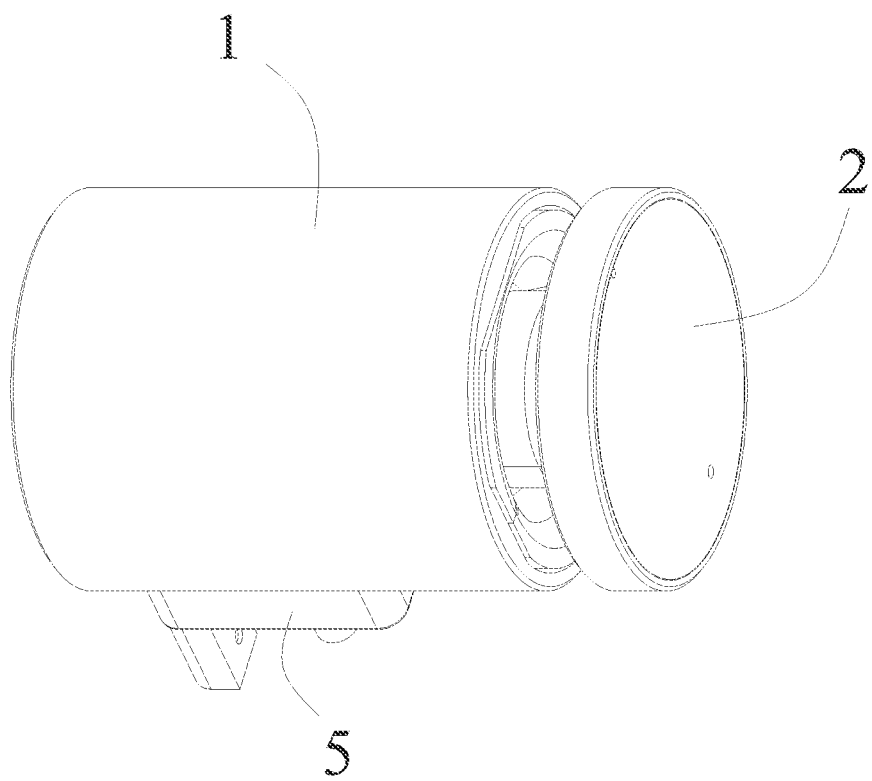
FIG. 1 is a schematic structural view of an imaging device according to an embodiment of the present disclosure.

In the drawings, the figures may not be drawn to actual scale.

DESCRIPTION OF REFERENCE NUMERALS

1: casing; 11: first accommodating cavity; 111: first portion; 112: second portion; 12: first opening; 13: second opening; 14: first through hole; 15: protrusion; 16: groove; 17: stepped surface;

2: lens module; 21: rotating portion; 22: extension portion; 23: protruding portion; 24: outer cover; 25: second accommodating cavity; 251: third opening; 252: fourth opening; 26: lens body; 27: lens; 28: connecting wire harness; 29: front lid; 291: fifth opening;

3: mounting component; 31: first clamping member; 311: first inner surface; 32: second clamping member; 321: second inner surface; 33: connecting member: 34: limiting portion; 341: stop surface; 342: first flat face; 343: second flat face; 344: arc surface; 35: fixing column;

4: circuit board; 41: circuit board body; 42: interface;

5: base; 51: basal portion; 511: second through hole; 52: mounting portion; 521: mounting hole; 53: positioning portion;

6: cover plate; 61: cover plate body; 62: hook;

7: heat conduction block;

8: fastener;

X: axial direction.

DETAILED DESCRIPTION

The implementation of the present disclosure will be described in further detail below in conjunction with the accompanying drawings and embodiments. The detailed description of the following embodiments and the accompanying drawings are used to exemplarily illustrate the principle of the disclosure, but are not intended to limit the scope of the disclosure. In other words, the disclosure is not limited to the described embodiments.

In the description of the present disclosure, it should be stated, unless otherwise specified, "a plurality of" refers to two or more; and the directions or positional relationships indicated by the terms such as "upper", "lower", "left", "right", "interior", and "exterior", are only for the convenience of describing the present disclosure and simplifying the description, and do not mean or imply that the involved device or element must have a specific orientation or must be configured or operated in the specific orientation, therefore, they cannot be understood as limiting the present disclosure. In addition, the terms such as "first", and "second" are only used for descriptive purposes, and should not be interpreted as indicating or implying relative importance. The term "perpendicular" is not strictly perpendicular, but may be perpendicular within the allowable tolerance range, and the term "parallel" is not strictly parallel, but may be parallel within the tolerance range.

The reference to "embodiment" in the present disclosure means that a specific feature, structure or characteristic described in conjunction with the embodiment may be included in at least one embodiment of the present disclosure. The appearance of the phrase at various positions in the specification does not necessarily refer to the same embodiment, nor refers to an independent or optional embodiment mutually exclusive with other embodiments. It can be clearly and implicitly appreciated by those skilled in the art that the embodiments described in the present disclosure may be combined with other embodiments.

In the description of the present disclosure, it should also be stated, unless otherwise specified and limited, the terms such as "mounted", "connected to", or "connected with" should be understood in a broad sense. For example, a connection may refer to fixed connection or disassembly connection; or may refer to integral connection; or may refer to direct connection or indirect connection through an intermediate medium. For the ordinary person skilled in the art, the specific meanings of the above terms in the present disclosure may be understood according to specific situations.

In order for a better understanding of the present disclosure, the embodiments of the present disclosure are described below with reference to FIGS. 1 to 8.

An embodiment of the present disclosure provides an imaging device, which may be mounted onto an interactive display screen, for example, an interactive display screen used in scene such as a classroom and a meeting room. Apparently, the imaging device of the present disclosure may also be applied to other scenarios that is not limited to an interactive display screen.

Figure 2:
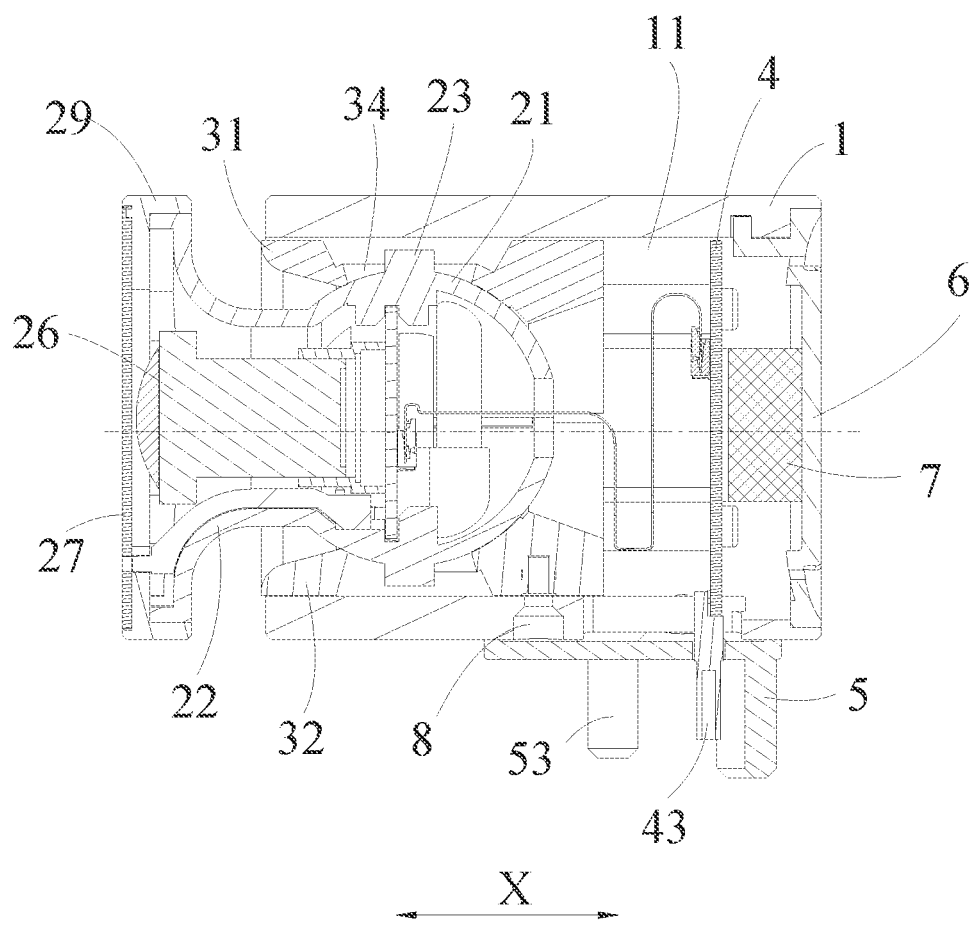
FIG. 2 is a cross-sectional view of the imaging device of FIG. 1.

With reference to FIG. 1 and FIG. 2, the imaging device according to the embodiment of the present disclosure includes a casing 1, a lens module 2 and a mounting component 3. The casing 1 includes a first accommodating cavity 11 therein, and a first opening 12 is provided at one end of the first accommodating cavity 11. Optionally, the casing 1 is cylinder-shaped. The lens module 2 has an imaging function, and the lens module 2 includes a rotating portion 21 and an extension portion 22 connected to the rotating portion 21. The rotating portion 21 is accommodated in the first accommodating cavity 11, and the extension portion 22 extends through the first opening 12 to an exterior of the casing 1. The mounting component 3 is at least partially accommodated in the first accommodating cavity 11 and fixed to the casing 1, and the rotating portion 21 is hinged with the mounting component 3 via a spherical joint.

In the imaging device according to the embodiment of the present disclosure, since the rotating portion 21 is hinged with the mounting component 3 via the spherical joint, the lens module 2 can be omnidirectionally rotatable within a preset angle range by means of the cooperation of the rotating portion 21 and the mounting component 3, thereby increasing the coverage region of the field of view of the lens module 2 and ensuring the imaging effect. Since the rotating portion 21 and the mounting component 3 are integrated into the first accommodating cavity 11 of the casing 1, the imaging device can have a more compact structure and a smaller volume. Since the extension portion 22 extends through the first opening 12 to the exterior of the casing 1, the lens module 2 can be freely rotated from the exterior of the casing 1 by using the extension portion 22.

Figure 3:
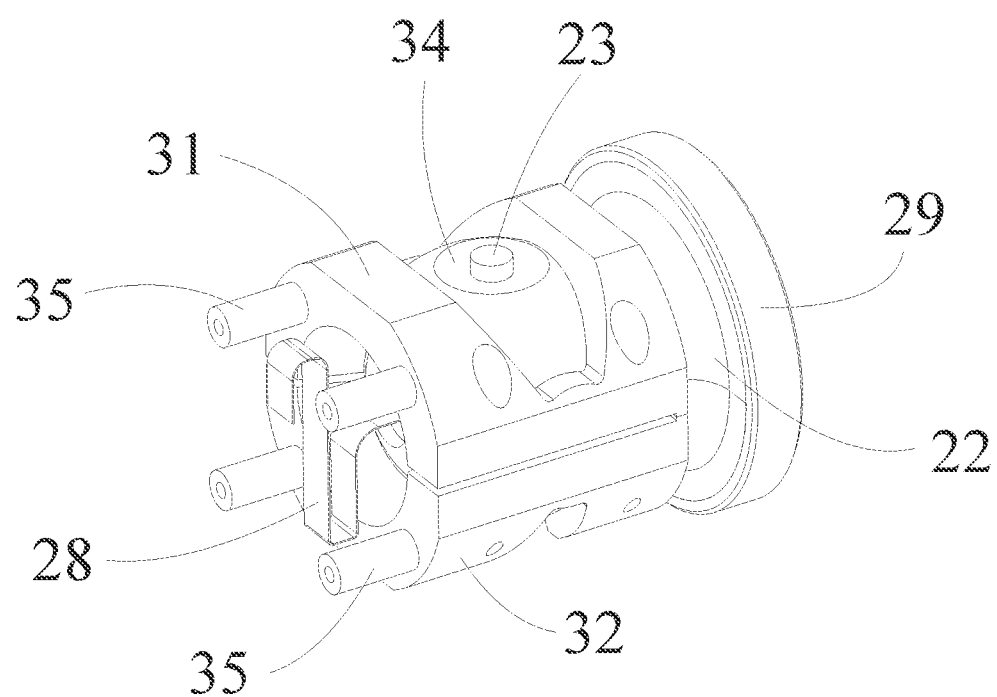
FIG. 3 is a schematic structural view of a lens module and a mounting component in a imaging device according to an embodiment of the present disclosure.
Figure 4:
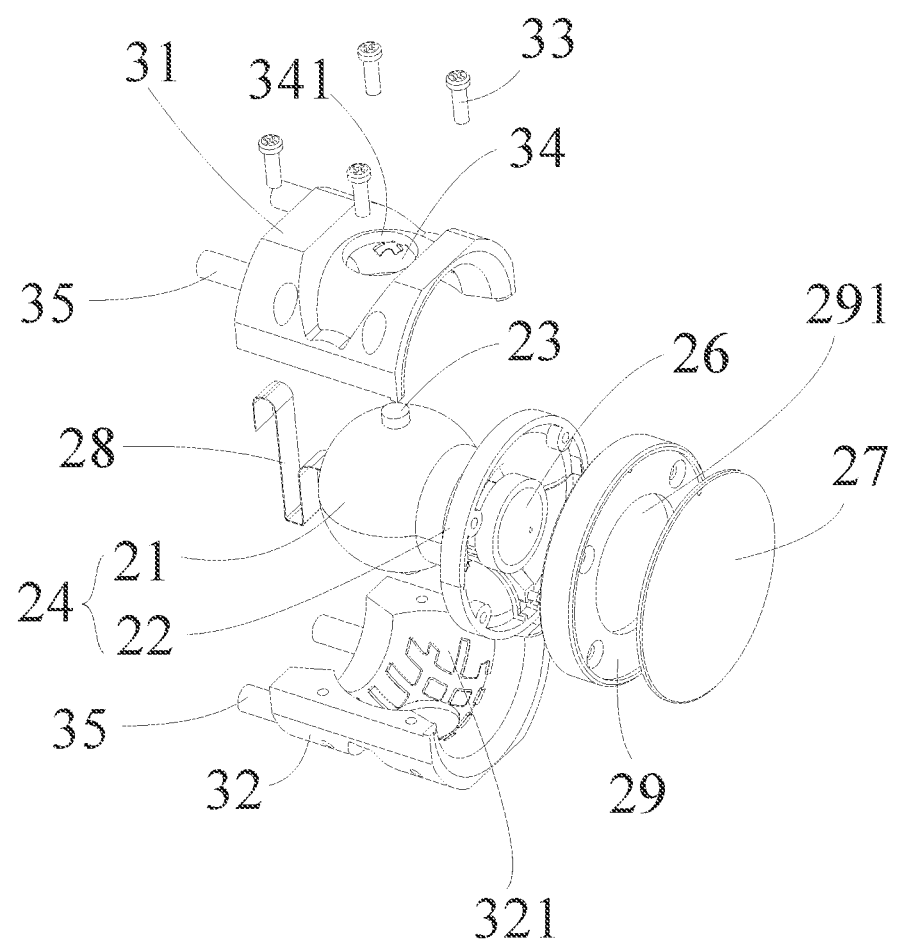
FIG. 4 is a schematic view of the lens module and the mounting component of FIG. 3 in an exploded state.
Figure 5:
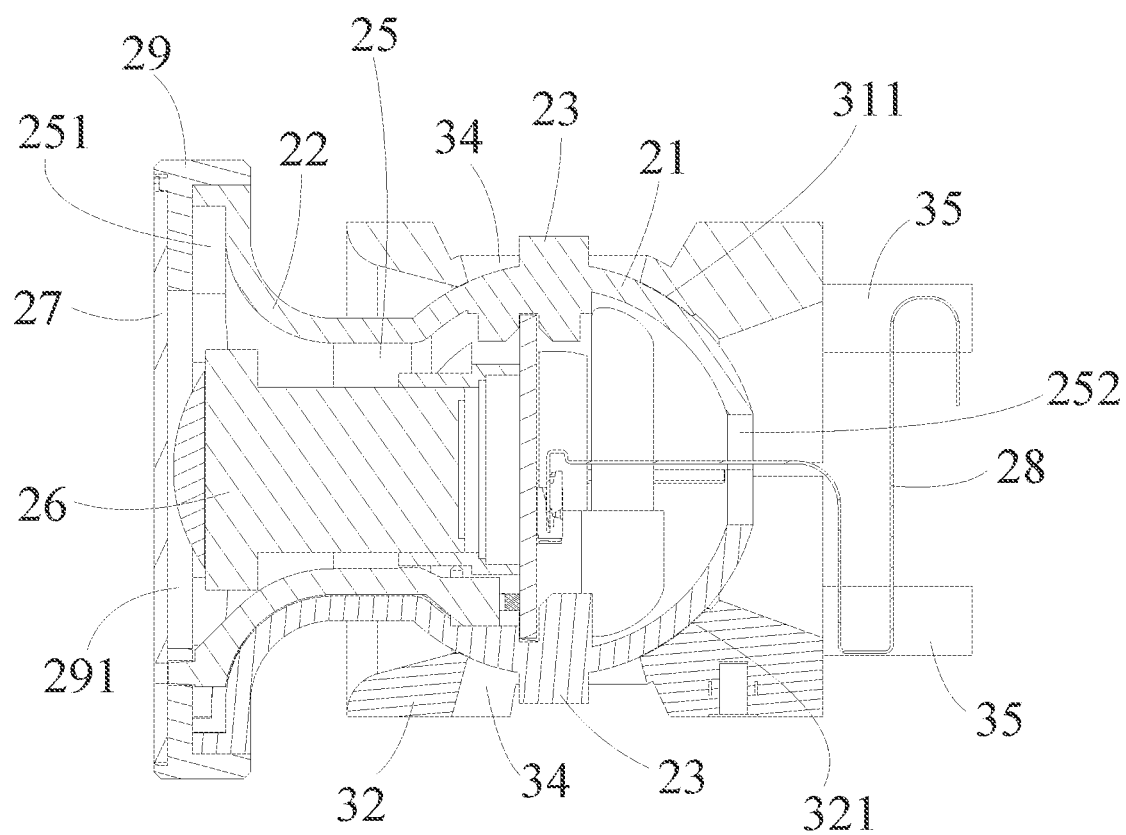
FIG. 5 is a cross-sectional view of the lens module and the mounting component of FIG. 3.

In some optional embodiments, with reference to FIGS. 3 to 5, the mounting component 3 includes a first clamping member 31, a second clamping member 32, and a connecting member 33 for connecting the first clamping member 31 and the second clamping member 32. The connecting member 33 may be a fastener. At least one of the first clamping member 31 and the second clamping member 32 is fixed to the casing 1.

The first clamping member 31 has a spherical, first inner surface 311, the second clamping member 32 has a spherical, second inner surface 321, and the rotating portion 21 is disposed between the first inner surface 311 and the second inner surface 321 and is in sliding contact with the first inner surface 311 and the second inner surface 321. The outer surface of the rotating portion 21 is a spherical surface.

The first clamping member 31 and the second clamping member 32 can clamp the rotating portion 21, and can change the clamping force applied by the first clamping member 31 and the second clamping member 32 by adjusting the connecting member 33. In some optional embodiments, the connecting member 33 is a bolt, the first clamping member 31 and the second clamping member 32 are both provided with threaded holes, and the bolt engages with the threaded holes to connect the first clamping member 31 and the second clamping member 32. When the bolt is tightened, the distance between the first clamping member 31 and the second clamping member 32 is decreased, and therefore the clamping force is increased; when the bolt is loosened, the distance between the first clamping member 31 and the second clamping member 32 is increased, and therefore the clamping force is decreased.

Since the first clamping member 31 and the second clamping member 32 clamp the rotating portion 21, the lens module 2, after rotated manually to any position, can maintain its position under the action of clamping force without shaking.

In some optional embodiments, the first clamping member 31 further includes a limiting portion 34 extending from the first inner surface 311 in a direction away from the rotating portion 21, and the lens module 2 further includes a protruding portion 23 protruding relative to the rotating portion 21. The protruding portion 23 is inserted into the limiting portion 34, and the limiting portion 34 is configured to limit the rotation range of the rotating portion 21 by the protruding portion 23. The limiting portion 34 defines a certain range, and the protruding portion 23 can move within the range defined by the limiting portion 34. Moreover, the limiting portion 34 can also prevent the protruding portion 23 from moving beyond the limiting portion 34, thereby limiting the rotation range of the rotating portion 21 by limiting movement of the protruding portion 23. By the provision of the limiting portion 34, the rotating portion 21 can be prevented from rotating excessively.

In some optional embodiments, with reference to FIG. 3, the limiting portion 34 is a through hole penetrating the first clamping member 31, and the protruding portion 23 may be exposed through the through hole. In other optional embodiments, the limiting portion 34 is a blind hole, and the blind hole is opened towards the rotating portion 21. In such case, the protruding portion 23 is covered by the first clamping member 31.

In some optional embodiments, with reference to FIGS. 3 and 4, the limiting portion 34 includes a stop surface 341 surrounding the exterior of the protruding portion 23. The stop surface 341 is a cylindrical surface, the protruding portion 23 is cylindrical, and the cylindrical surface has a diameter greater than a diameter of the protruding portion 23. In this case, the protruding portion 23 can move freely within the limiting portion 34, so as to achieve the omnidirectional rotation of the rotating portion 21 within the preset angle range.

Figure 6:
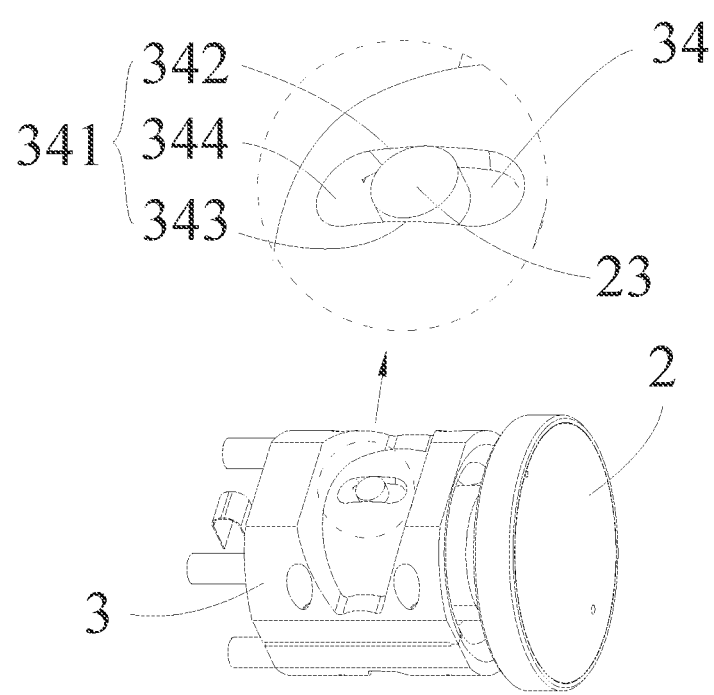
FIG. 6 is a schematic structural view of a lens module and a mounting component in an imaging device according to another embodiment of the present disclosure.

In other optional embodiments, with reference to FIG. 6, the limiting portion 34 includes a stop surface 341 surrounding the exterior of the protruding portion 23. The protruding portion 23 is cylindrical. The stop surface 341 includes a first flat face 342 and a second flat face 343 which are arranged in parallel to each other. The first flat face 342 and the second flat face 343 are parallel to an axial direction X of the casing 1 and an axial direction of the protruding portion 23. The protruding portion 23 is disposed between the first flat face 342 and the second flat face 343, and the protruding portion 23 has a diameter equal to the distance between the first flat face 342 and the second flat face 343. In a direction perpendicular to the first flat face 342, the protruding portion 23 and the limiting portion 34 are in clearance fit, and the protruding portion 23 is rotatable about its own axial direction or slide along the first flat face 342 and the second flat face 343. However, the protruding portion 23 is prevented from moving in a direction perpendicular to the first flat face 342, since such movement of the protruding portion 23 may cause the lens module 2 to rotate about its central axis (parallel to the axial direction X of the casing 1). If the lens module 2 rotates about its central axis, the captured image will be skewed, and further processing of the captured image is required. Therefore, in some optional embodiments of the present disclosure, the first flat face 342 and the second flat face 343 are provided to prevent the lens module 2 from rotating about its central axis.

Optionally, the stop surface 341 further includes two arc surfaces 344, and each of the arc surfaces 344 connects an end portion of the first flat face 342 and an end portion of the second flat face 343. The arc surfaces 344 can limit the movement of the protruding portion 23 in a direction parallel to the first flat face 342.

In some optional embodiments, with reference to FIG. 5, the second clamping member 32 also includes a limiting portion 34 extending from the second inner surface 321 in a direction away from the rotating portion 21. Correspondingly, the lens module 2 further includes a protruding portion 23 protruding relative the rotating portion 21 and inserted into the limiting portion 34 of the second clamping member 32. The limiting portion 34 of the second clamping member 32 limits the rotation range of the rotating portion 21 by the protruding portion 23 inserted therein. The limiting portion 34 of the second clamping member 32 is a through hole or a blind hole.

In some optional embodiments, with reference to FIGS. 4 and 5, the rotating portion 21 and the extension portion 22 are integrally disposed and a second accommodating cavity 25 is formed therein, and at two ends of the second accommodating cavity 25, a third opening 251 formed on the extension portion 22 and a fourth opening 252 formed on the rotating portion 21 are provided. Optionally, the rotating portion 21 together with the extension portion 22 forms an outer cover 24, and the second accommodating cavity 25 is disposed within the outer cover 24. The outer cover 24 may be formed by butting two sub-covers, and each of the sub-covers includes a half of the rotating portion 21 and a half of the extension portion 22.

The lens module 2 further includes a lens body 26, a lens 27 and a connecting wire harness 28. The lens body 26 is housed in the second accommodating cavity 25 and is capable of imaging. The lens 27 is connected to the extension portion 22 and covers the third opening 251. The connecting wire harness 28 is connected to the lens body 26 and protrudes out through the fourth opening 252. The lens 27 can protect the lens body 26 and reduce the risk of contamination and damage of the lens body 26. The outer cover 24 may be formed by butting two sub-covers, so the lens body 26 can be more conveniently fixed into the outer cover 24.

Optionally, the lens module 2 further includes a front lid 29, the front lid 29 is fixed to the extension portion 22 and includes a fifth opening 291 disposed opposite to the third opening 251, and the lens 27 is fixed to the front lid 29 and covers the fifth opening 291. The front lid 29 can be used connect the lens 27 and the extension portion 22.

Figure 7:
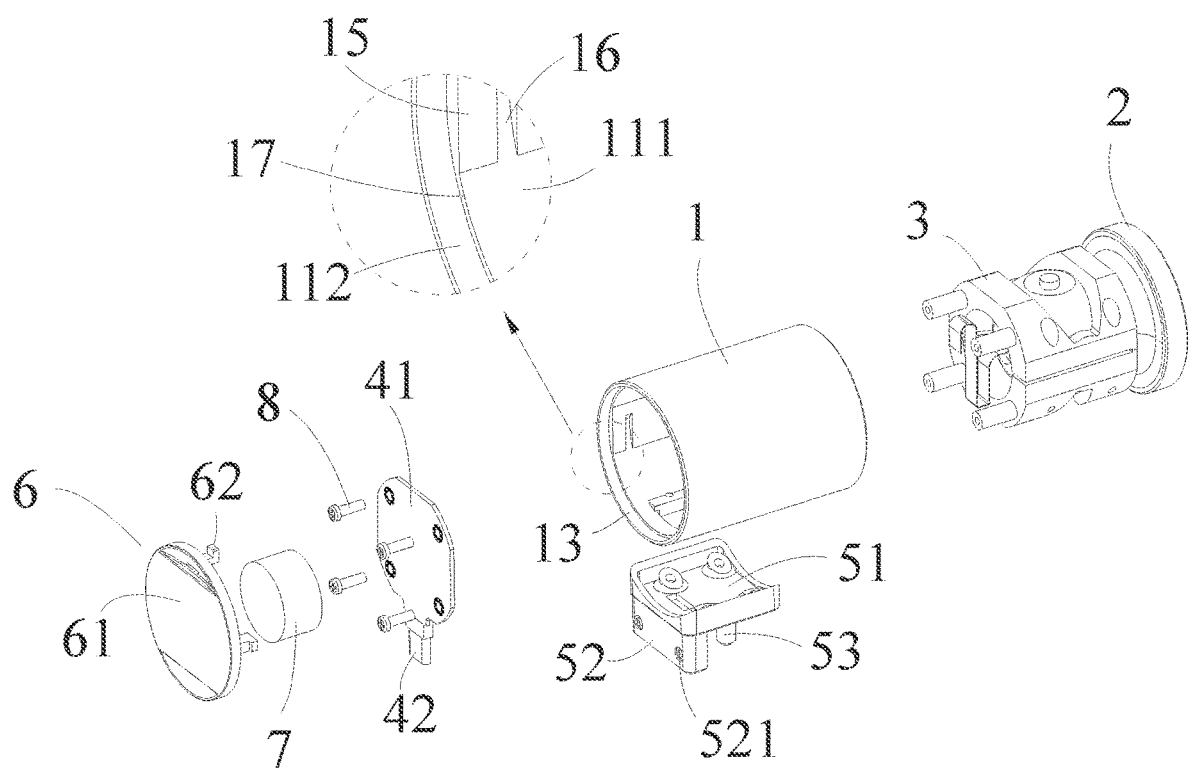
FIG. 7 is a schematic view of an imaging device according to an embodiment of the present disclosure in an exploded state.
Figure 8:
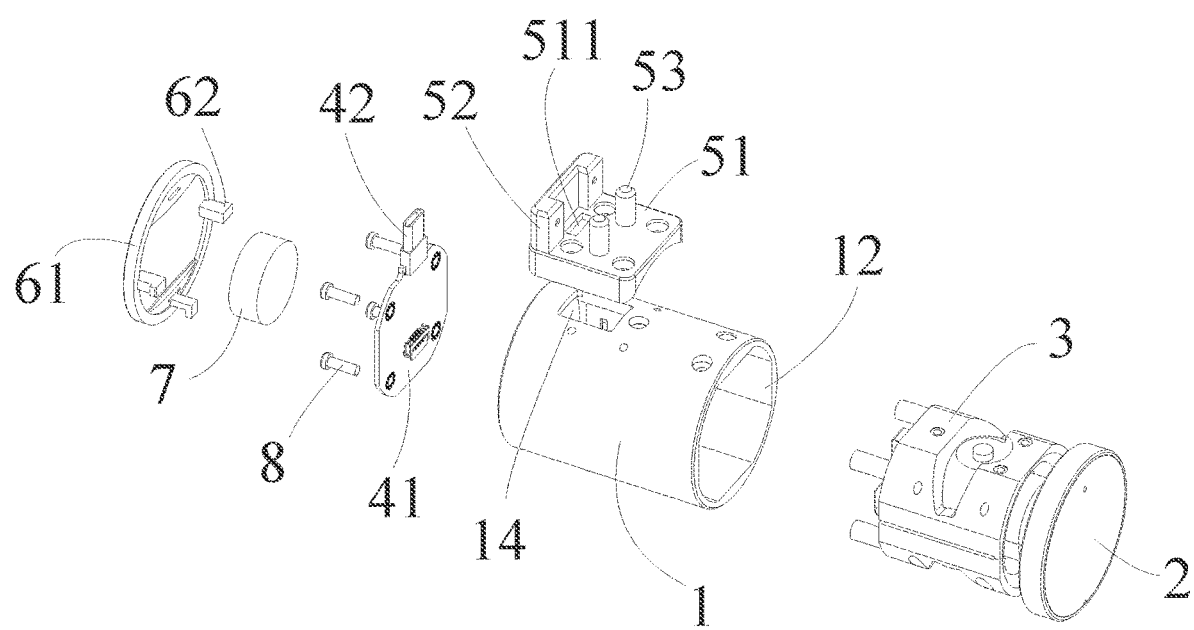
FIG. 8 is another schematic view of the imaging device according to an embodiment of the present disclosure in an exploded state.

In some optional embodiments, with reference to FIGS. 7 and 8, the imaging device further includes a circuit board 4, the circuit board 4 is at least partially housed in the first accommodating cavity 11, and the circuit board 4 is disposed on a side of the rotating portion 21 away from the extension portion 22 and is electrically connected to the lens module 2. Optionally, the lens body 26 of the lens module 2 is connected to the circuit board 4 via the connecting wire harness 28. The circuit board 4 is used to receive and process image information captured by the lens body 26 and transmit it to an external interactive display screen.

At least one of the first clamping member 31 and the second clamping member 32 is provided with a fixing column 35, and the circuit board 4 is fixed to the fixing column 35. Optionally, both the first clamping member 31 and the second clamping member 32 are provided with fixing columns 35, and the circuit board 4 can be fixed to the fixing columns 35 by fasteners 8.

In some optional embodiments, the circuit board 4 includes a circuit board body 41 and an interface 42 connected to the circuit board body 41. A through hole is provided on the circuit board body 41, and the fastener 8 passes through the through hole of the circuit board body 4 and is fixed to the fixing column 35.

A first through hole 14 is provided on an outer wall of the casing 1 surrounding the first accommodating cavity 11, and the interface 42 of the circuit board 4 protrudes out of the casing 1 through the first through hole 14. The interface 42 is used to interface with an interface on the interactive display screen, so as to transmit the image information captured by the lens body 26 to the interactive display screen. Optionally, the interface 42 is a TYPE C interface.

In some optional embodiments, the imaging device further includes a base 5, and the base 5 is provided to mount the imaging device onto the interactive display screen. The base 5 includes a basal portion 51 fixed to the exterior of the casing 1, the basal portion 51 has a second through hole 511 disposed opposite to the first through hole 14, and the interface 42 passes through the second through hole 511. By the provision of the second through hole 511, the interface 42 may be exposed, thereby facilitating the connection between the interface 42 and the interactive display screen.

The base 5 further includes a mounting portion 52 and a positioning portion 53, and the mounting portion 52 and the positioning portion 53 are disposed on a side of the basal portion 51 away from the casing 1 and are connected to the basal portion 51. The mounting portion 52 is mounted onto the interactive display screen, and the positioning portion 53 used to position during the mounting of the imaging device on the interactive display screen, so as to improve the mounting efficiency of the mounting portion 52 and the interactive display screen. Optionally, a mounting hole 521 is provided on the mounting portion 52, and the mounting portion 52 may be fixed to the interactive display screen via a fastener passing through the mounting hole 521.

In some optional embodiments, a second opening 13 is further provided on the other end of the first accommodating cavity 11. Both ends of the first accommodating cavity 11 are opened, thereby simplifying the molding process of the casing 1. The imaging device further includes a cover plate 6. The cover plate 6 is connected to the casing 1 and covers the second opening 13, thereby improving the sealing performance of the imaging device. Optionally, the cover plate 6 is clamped to the casing 1.

In some optional embodiments, a plurality of protrusions 15 are provided on the inner surface of the casing 1, and the plurality of protrusions 15 are arranged to be spaced apart from each other along the circumference of the casing 1, and a groove 16 is provided on each of the protrusions 15. The cover plate 6 includes a cover plate body 61 and a plurality of hooks 62 disposed inside the cover plate body 61. The plurality of hooks 62 are arranged to be spaced apart from each other along the circumference of the cover plate body 61, and each of the hooks 62 is inserted into the corresponding one of the grooves 16 and is clamped by the protrusion 15. Optionally, the hooks 62 are in the same number as the grooves 16, and further, the protrusion 15, the hooks 62 and the grooves 16 are respectively in three.

When the casing 1 and the cover 6 are assembled, the hooks 62 are first inserted into the casing 1 through the second opening 13 (note that the hooks 62 are staggered from the protrusions 15 during the insertion process), and the cover plate body 61 is then turned, such that the hooks 62 are inserted into the grooves 16 to achieve the clamping connection between the cover plate 6 and the casing 1.

In some optional embodiments, the first accommodating cavity 11 includes a first portion 111 and a second portion 112. The first portion 111 has an aperture smaller than that of the second portion 112, and a stepped surface 17 is formed at the connection between the first portion 111 and the second portion 112. The rotating portion 21 is accommodated in the first portion 111, and the cover plate body 61 is at least partially accommodated in the second portion 112 and abuts against the stepped surface 17. The cover plate body 61 is at least partially accommodated in the second portion 112, to make full use of the internal space of the casing 1, thereby reducing the volume of the imaging device.

In the process of inserting the cover plate body 61 into the second portion 112, the stepped surface 17 can play a positioning function. When the cover plate body 61 abuts against the stepped surface 17, the hooks 62 move to a position right corresponding to the grooves 16, and the hooks 62 may be then inserted into the grooves 16 as long as the cover plate body 61 is turned.

In some optional embodiments, the imaging device further includes a heat conduction block 7. The heat conduction block 7 is sandwiched between the circuit board 4 and the cover 6 and is in contact with the circuit board 4 and the cover 6. The heat conduction block 7 can transfer the heat of the circuit board 4 to the cover plate 6 and radiate it outward through the cover plate 6, thereby reducing the temperature of the circuit board 4 and improving the performance and life of the circuit board 4.

Optionally, the heat conduction block 7 is made of an elastic material and is in a compressed state. In the compressed state, the heat conduction block 7 may be abutted closely against the cover plate 6 and the circuit board 4, to improve the heat dissipation efficiency. Meanwhile, the heat conduction block 7 may also exert pressure to the cover plate 6, thereby ensuring that the hook 62 is abutted closely against a groove wall of the groove 16, and preventing the hook 62 from being loosened due to the clearance fit between the hook 62 and the groove 16 and prevent the cover plate 6 from falling off.

An embodiment of the present disclosure also provides a display apparatus, which includes a display device and the imaging device as described in any of the above embodiments, and the imaging device is connected to the display device. In some embodiments, the display device includes an interactive display screen, which may be applied in scenes such as classrooms and conference rooms.

Although the present disclosure has been described with reference to the preferred embodiments, various improvements can be made and equivalents can be used to replace the components therein without departing from the scope of the disclosure. Especially, all the technical features mentioned in each embodiment can be combined in any way as long as there is no structural conflict. The present disclosure is not limited to the disclosed specific embodiments, but includes all technical solutions falling within the scope of the claims.

What is claimed is:

1. An imaging device, comprising:
   a casing comprising a first accommodating cavity therein, wherein a first opening is provided at one end of the first accommodating cavity;
   a lens module comprising a rotating portion and an extension portion connected to the rotating portion, the rotating portion being accommodated in the first accommodating cavity, the extension portion extending through the first opening to an exterior of the casing; and
   a mounting component, which is at least partially accommodated in the first accommodating cavity and fixed to the casing, wherein the rotating portion is hinged with the mounting component via a spherical joint,
   wherein the mounting component comprises a first clamping member, a second clamping member, and a connecting member for connecting the first clamping member and the second clamping member, at least one of the first clamping member and the second clamping member being fixed to the casing, and
   wherein the first clamping member comprises a spherical, first inner surface, the second clamping member comprises a spherical, second inner surface, and the rotating portion is disposed between the first inner surface and the second inner surface and is in sliding contact with the first inner surface and the second inner surface.

2. The imaging device according to claim 1, wherein the first clamping member further comprises a limiting portion extending from the first inner surface in a direction away from the rotating portion, the lens module further includes a protruding portion protruding relative to the rotating portion, the protruding portion is inserted into the limiting portion, and the limiting portion is configured to limit a rotation range of the rotating portion by the protruding portion.

3. The imaging device according to claim 2, wherein the limiting portion comprises a stop surface surrounding an exterior of the protruding portion, the stop surface is a cylindrical surface, the protruding portion is cylindrical, and the cylindrical surface has a diameter greater than that of the protruding portion; or
   the limiting portion comprises a stop surface surrounding an exterior of the protruding portion, the protruding portion is cylindrical, and the stop surface comprises a first flat face and a second flat face that are arranged in parallel to each other, the first flat face and the second flat face are parallel to an axial direction of the casing and an axial direction of the protruding portion, the protruding portion is disposed between the first flat face and the second flat face, and the protruding portion has a diameter equal to a distance between the first flat face and the second flat face.

4. The imaging device according to claim 1, wherein the imaging device further comprises a circuit board, the circuit board is at least partially accommodated in the first accommodating cavity, the circuit board is disposed on a side of the rotating portion away from the extension portion and is electrically connected to the lens module; and at least one of the first clamping member and the second clamping member is provided with a fixing column, and the circuit board is fixed to the fixing column.

5. The imaging device according to claim 4, wherein the casing is provided with a first through hole, the first through hole is in communication with the first accommodating cavity, the circuit board comprises an interface, and the interface protrudes out of the casing through the first through hole.

6. The imaging device according to claim 5, wherein the imaging device further comprises a base, the base comprises a basal portion fixed to the exterior of the casing, the basal portion comprises a second through hole which is disposed opposite to the first through hole, and the interface passes through the second through hole.

7. The imaging device according to claim 6, wherein the base further comprises a mounting portion and a positioning portion, and the mounting portion and the positioning portion are located on a side of the basal portion away from the casing and connected to the basal portion.

8. The imaging device according to claim 4, wherein a second opening is further provided at the other end of the first accommodating cavity; and the imaging device further comprises a cover plate that is clamped to the casing and covers the second opening.

9. The imaging device according to claim 8, wherein a plurality of protrusions are provided on an inner surface of the casing, and the plurality of protrusions are arranged to be spaced apart from each other along a circumference of the casing, and a groove is provided on each of the protrusions; and the cover plate includes a cover plate body and a plurality of hooks located inside the cover plate body, the plurality of hooks are arranged to be spaced apart from each other along a circumference of the cover plate body, and each of the hooks is inserted into a corresponding one of the grooves and is clamped by the protrusion.

10. The imaging device according to claim 9, wherein the first accommodating cavity comprises a first portion and a second portion, the first portion has an aperture smaller than that of the second portion, and a stepped surface is formed at the connection between the first portion and the second portion; and the rotating portion is accommodated in the first portion, and the cover plate body is at least partially accommodated in the second portion and abuts against the stepped surface.

11. The imaging device according to claim 8, wherein the imaging device further comprises a heat conduction block, and the heat conduction block is sandwiched between the circuit board and the cover plate and is in contact with the circuit board and the cover plate.

12. The imaging device according to claim 1, wherein the rotating portion and the extension portion are integrally disposed and a second accommodating cavity is formed therein, and a third opening formed on the extension portion and a fourth opening formed on the rotating portion are provided at two ends of the second accommodating cavity; and the lens module further comprises a lens body, a lens, and a connecting wire harness, the lens body is accommodated in the second accommodating cavity and capable of imaging, the lens is connected to the extension portion and covers the third opening, and the connecting wire harness is connected to the lens body and protrudes out through the fourth opening.

13. A display apparatus, comprising a display device and the imaging device according to claim 1, the imaging device being connected to the display device.

* * * * *